United States Patent
Volk et al.

(10) Patent No.: US 9,201,738 B2
(45) Date of Patent: Dec. 1, 2015

(54) METHOD, COMPUTER READABLE STORAGE MEDIUM AND COMPUTER SYSTEM FOR OBTAINING SNAPSHOTS OF DATA

(71) Applicant: GLOBALFOUNDRIES Inc., Grand Cayman (KY)

(72) Inventors: Peter Benjamin Volk, Dresden (DE); Volkmark Kuhn, Dresden (DE); Sebastian Knappe, Dresden (DE); Andreas Rossmann, Radebeul (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 247 days.

(21) Appl. No.: 13/966,934

(22) Filed: Aug. 14, 2013

(65) Prior Publication Data

US 2015/0052108 A1    Feb. 19, 2015

(51) Int. Cl.
*G06F 17/30*    (2006.01)
*G06F 11/14*    (2006.01)

(52) U.S. Cl.
CPC .................................. *G06F 11/1446* (2013.01)

(58) Field of Classification Search
CPC .......... G06F 17/30212; G06F 2201/84; G06F 17/30575; G06F 11/1446
USPC ....................................................... 707/649
See application file for complete search history.

(56) References Cited

U.S. PATENT DOCUMENTS

| | | | |
|---|---|---|---|
| 5,381,543 A | 1/1995 | Blomgren et al. | |
| 5,778,165 A | 7/1998 | Saxon | |
| 5,857,208 A | 1/1999 | Ofek | |
| 6,061,770 A | 5/2000 | Franklin | |
| 6,078,932 A | 6/2000 | Haye et al. | |
| 6,618,794 B1 | 9/2003 | Sicola et al. | |
| 7,257,257 B2 | 8/2007 | Anderson et al. | |
| 2013/0198139 A1* | 8/2013 | Skidanov et al. | 707/649 |
| 2015/0019909 A1* | 1/2015 | Griffith et al. | 714/15 |

OTHER PUBLICATIONS

Joerg and Dessloch, "Formalizing ETL Jobs for Incremental Loading of Data Warehouse," Proceedings of PTW 2009, 327-346, ISBN 978-3-88579-238-3.

* cited by examiner

*Primary Examiner* — Etienne Leroux
*Assistant Examiner* — Cindy Nguyen
(74) *Attorney, Agent, or Firm* — Amerson Law Firm, PLLC

(57) ABSTRACT

A method includes requesting a source database system including a source database table to record a transaction log including a plurality of transaction log entries that are representative of transactions including modifications of the source database table and to create a snapshot of the source database table during the recording of the transaction log. For each of a plurality of snapshot entries in the snapshot, one or more validity time intervals during which the snapshot entry is valid are determined on the basis of the transaction log. The snapshot entry is valid as long as it matches a corresponding entry in the source database table. A point in time at which a number of valid ones among the plurality of snapshot entries is maximum is determined. The calculated point in time is returned as an approximate value of a point in time at which the snapshot was created.

20 Claims, 8 Drawing Sheets

| unique key (401) | content (402) |
|---|---|
| 1 | A | ← 403
| 2 | B | ← 404
| 3 | C | ← 405

| source unique key (501) | modification type (502) | modification time (503) | content (504) |
|---|---|---|---|
| 2 | update | 1 | B | ← 505
| 1 | update | 3 | A | ← 506
| 3 | insert | 4 | C | ← 507
| 1 | update | 5 | G | ← 508
| 3 | update | 5 | D | ← 509
| 2 | delete | 6 | B | ← 510
| 1 | update | 7 | A | ← 511

METHOD, COMPUTER READABLE STORAGE MEDIUM AND COMPUTER SYSTEM FOR OBTAINING SNAPSHOTS OF DATA

BACKGROUND OF THE INVENTION

1. Field of the Invention

Generally, the present disclosure relates to the field of computer systems, and, more particularly, to computer systems and methods carried out by computer systems wherein snapshots of data are created.

2. Description of the Related Art

In factories for the manufacturing of complex products, such as, for example, semiconductor devices, computerized systems may be employed for optimizing manufacturing processes, and for providing real-time feedback on current conditions of the factory. Such computerized systems may include manufacturing execution systems that are connected to distributed systems of process automation, and allow monitoring and control of the production in the factory in real-time.

Computerized systems used in manufacturing may be combined with a central repository of data wherein data from different source systems are integrated in a standardized data format. Such a central repository of data wherein data from different source systems is integrated is denoted as a "data warehouse." Data integrated into a data warehouse need not be provided by a manufacturing execution system. Additionally or alternatively, data integrated into a data warehouse may be provided by other sources of data.

For initializing a data warehouse, source data stored in the source systems may be retrieved. The source data may be provided in the form of source database tables that may include fact tables and dimension tables. Fact tables may store measures that are referred to as facts, and typically include numerical values that may be aggregated. Dimension tables may contain textual descriptions of entities.

The source data retrieved from the source systems may be processed in accordance with an extract-transform-load process, wherein relevant data are extracted from the retrieved source data, are transformed to fit operational needs of the data warehouse and are loaded into the data warehouse.

After the initialization of the data warehouse, updates of the data warehouse may be performed, so that changes of the source data at the source systems are introduced into the data warehouse for keeping the data warehouse up to date. The updates may be performed by means of incremental updates, wherein changes of the source data that have occurred since the last update, or, in the case of the first update performed after the initialization of the data warehouse, since the point in time at which the initialization was performed, are retrieved from the source systems, transformed into the data format of the data warehouse and stored in the data warehouse.

For purposes of initializing a data warehouse, it would be advantageous to disallow a source system from which source data are retrieved to continue to make changes to the source data, for example, during a downtime of the source system. During this downtime, the data could be retrieved from the source system and then processed in accordance with an extract-transform-load scheme. However, in computerized systems employed in a production environment wherein it is intended to manufacture products every day and for 24 hours each day, a downtime of the computerized system may cause an interruption of production, which is very expensive and, accordingly, is allowed only in exceptional cases.

Therefore, data are frequently retrieved from a source system by creating snapshots of the source data while the source system continues to perform changes on the data. Typically, this is performed automatically by a prewritten script. The source system may employ concurrency control techniques for providing a consistent snapshot of each source database table stored in the source system. However, the data retrieved from the source system may include multiple source database tables, wherein the snapshots of the individual source database tables are created at different times.

Thus, for updating the data in the data warehouse by means of an incremental update, it is desirable to know the point in time at which the snapshot of each table was created to know from what time the incremental maintenance of the data in the data warehouse corresponding to the table is to be continued.

U.S. Pat. No. 7,257,257 discloses a method and an apparatus for providing differential bandwidth efficient and storage efficient backups and restoration. The method and apparatus employ differential contours that include differences between some given reference contour and a new contour, wherein a "contour" includes a snapshot of the state of every object to be stored or manipulated within a designated collection of such objects, and supplementary annotations or metadata at a given time. For providing the differential contours, content identifiers which may, for example, be generated by using cryptographic hash algorithms may be employed.

U.S. Pat. No. 6,618,794 discloses a system for generating a virtual point-in-time snapshot of a selected volume or logical unit of a storage system. The system operates by using a bitmap in a cache memory to indicate blocks of memory in the selected volume that have been overwritten since the snapshot was initiated. When a write to the selected volume is requested, the cache bitmap is checked to determine whether the original data has already been copied from the selected volume to a temporary volume. If the original data was previously copied, then the write proceeds to the selected volume. If, however, the original data would be overwritten by the presently requested write operation, then an area containing the original data is copied from the selected volume to the temporary volume. Reads from the temporary volume first check the bitmap to determine if the requested data has already been copied from the selected volume to the temporary volume. If so, the data is read from the temporary volume. Otherwise, the data is read from the selected volume.

Jörg and Dessloch, "Formalizing ETL Jobs for Incremental Loading of Data Warehouses," *Proceedings of PTW*, 327-346, ISBN 978-3-88579-238-3, 2009, discloses an automated creation of incremental load jobs for data warehouses.

Further techniques for obtaining backups including snapshots of data from a source system are disclosed in U.S. Pat. Nos. 6,078,932, 6,061,770, 5,857,208, 5,778,165 and 5,381,543.

Techniques wherein snapshots of source data tables are obtained at a particular point in time for each source database table and wherein changes of the source database are made during the creation of the snapshots may have particular issues associated therewith. Information concerning the time of creation of the snapshot of a source database table, if obtainable from the source system, may have an insufficient accuracy, in particular if changes of the source database are made at a high frequency. This may lead to inaccurate and potentially false data when the information is used for performing incremental updates. Moreover, the source database system may be provided by a different organizational or business unit than the data warehouse, and access to information from the source database system concerning the exact point in time at which snapshots of source database tables were made may be restricted.

In view of the situation described above, the present disclosure provides methods, computer readable storage media and computer systems that allow determining a point in time at which a snapshot of a source database table in a source database system was made with a relatively high accuracy.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

An illustrative method disclosed herein includes requesting a source database system including a source database table to record a transaction log including a plurality of transaction log entries that are representative of transactions including modifications of the source database table and to create a snapshot of the source database table during the recording of the transaction log. For each of a plurality of snapshot entries in the snapshot, one or more validity time intervals during which the snapshot entry is valid are determined on the basis of the transaction log. The snapshot entry is valid as long as it matches a corresponding entry in the source database table. A point in time at which a number of valid ones among the plurality of snapshot entries is maximum is calculated. The calculated point in time is returned as an approximate value of a point in time at which the snapshot was created.

An illustrative computer readable storage medium disclosed herein includes code for causing a computer to request a source database system including a source database table to record a transaction log including a plurality of transaction log entries that are representative of transactions including modifications of the source database table and to create a snapshot of the source database table during the recording of the transaction log. The code further causes the computer to determine, for each of a plurality of snapshot entries in the snapshot, one or more validity time intervals during which the respective snapshot entry is valid. The snapshot entry is valid as long as it matches a corresponding entry in the source database table. The determination of the one or more validity time intervals is performed on the basis of the transaction log. The code further causes the computer to calculate a point in time at which a number of valid ones among the plurality of snapshot entries is maximum, and to return the calculated point in time as an approximate value of a point in time at which the snapshot was created.

An illustrative data processing system disclosed herein includes a data retriever, a validity time interval identifier and a point in time calculator. The data retriever establishes a connection to a source database system, and requests the source database system to record a transaction log including a plurality of transaction log entries that are representative of transactions including modifications of a source database table stored in the source database system. The data retriever further requests the source database system to create a snapshot of the source database table while the transaction log is recorded. The data retriever retrieves the transaction log and the snapshot from the source database system. The validity time interval identifier determines, for each of a plurality of snapshot entries in the snapshot, one or more validity time intervals during which the respective snapshot entry is valid. The snapshot entry is valid if it matches a corresponding entry in the source database table. The determination of the one or more validity time intervals is performed on the basis of the transaction log. The point in time calculator calculates a point in time at which a number of valid ones among the plurality of snapshot entries is maximum. The calculation of the point in time is performed on the basis of the determined validity time intervals. The point in time calculator returns the calculated point in time as an approximate value of a point in time at which the snapshot was created.

An illustrative computer system disclosed herein includes a source database system and a data processing system. The source database system includes a source database including a source database table, means for recording a transaction log including a plurality of transaction log entries that are representative of transactions including modifications of the source database table, means for creating a snapshot of the source database table during the recording of the transaction log and means for transmitting the snapshot and the transaction log to the data processing system. The data processing system includes means for receiving the snapshot and the transaction log from the source database system, means for determining, for each of a plurality of snapshot entries in the snapshot, one or more validity time intervals during which the snapshot entry is valid, wherein the snapshot entry is valid as long as it matches a corresponding entry in the source database table, the determination of the validity time intervals being performed on the basis of the transaction log, and means for calculating a point in time at which a number of valid ones among the plurality of snapshot entries in the snapshot is maximum and returning the calculated point in time as an approximate value of a point in time at which the snapshot was created.

BRIEF DESCRIPTION OF THE DRAWINGS

The disclosure may be understood by reference to the following description taken in conjunction with the accompanying drawings, in which like reference numerals identify like elements, and in which:

FIG. 4 schematically illustrates a snapshot of a source database table;

FIG. 5 schematically illustrates a transaction log;

Figure 1:
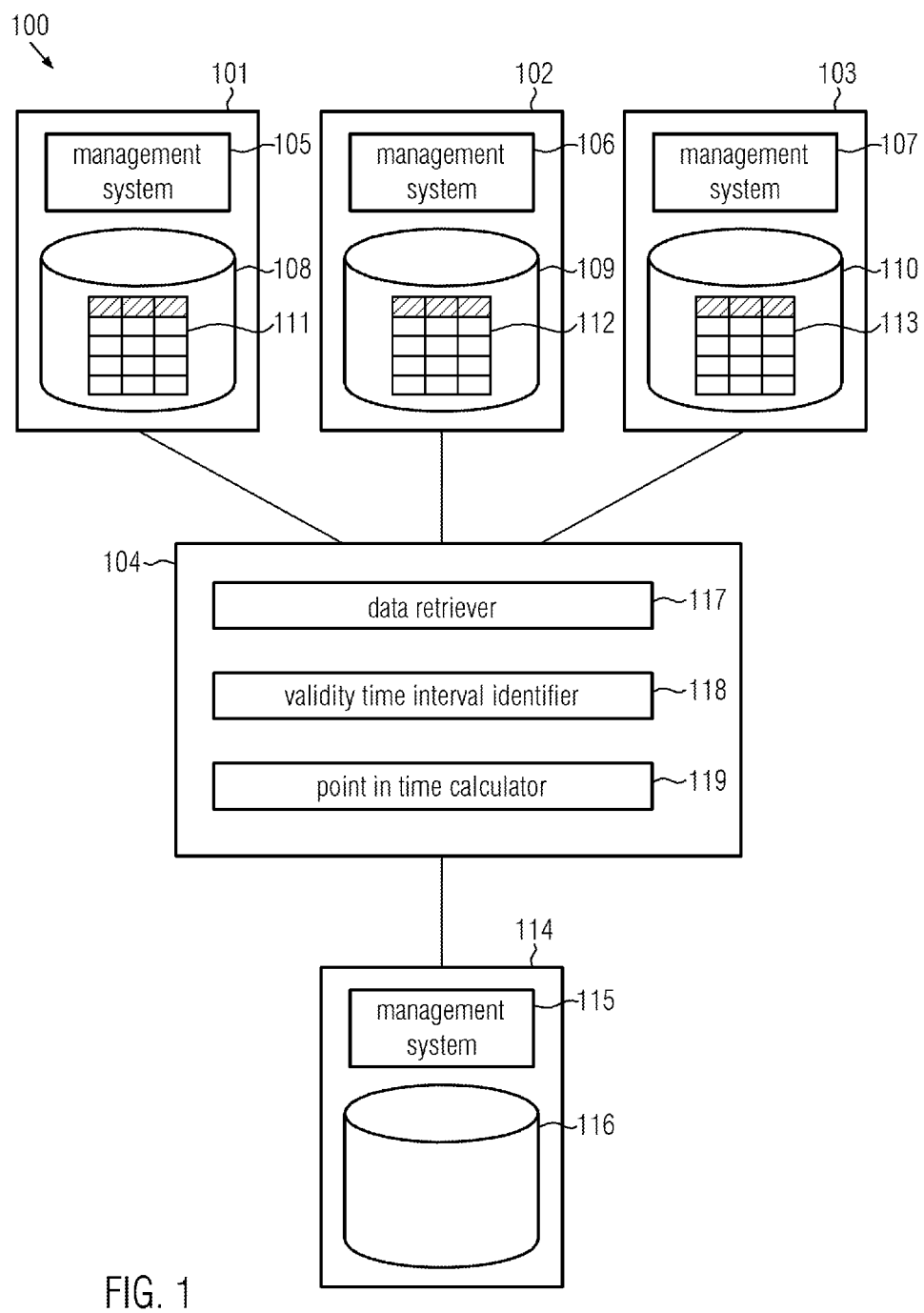
FIG. 1 shows a schematic block diagram of a computer system according to an embodiment.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

The present disclosure provides embodiments that may allow substantially avoiding or at least reducing downtime of source systems and increasing the flexibility in deployments during the initialization of a data warehouse without jeopardizing the data quality. This may result in a higher uptime of the source system. Moreover, in embodiments wherein the source system includes a computerized system used in manufacturing, such as a manufacturing execution system, a substantially continuous manufacturing may be enabled, the flexibility may be increased, and the risk of incidents for information technology operations induced by a downtime may be reduced.

Embodiments of the present disclosure provide a method of determining the exact point in time at which a snapshot of a source database table retrieved from a source database system was created, or at least an approximate value of this point in time having a sufficient degree of accuracy for performing incremental updates of a data warehouse on the basis of the determined point in time. This may help to obtain a high data quality of the resulting data warehouse, which may serve the users with correct data for decision making. For this purpose, the methods may employ a partially or substantially completely replicated transaction log from the source database.

In methods according to embodiments disclosed herein, a replication of the database transaction log of the source system may be enabled. Then, snapshots of one or more source database tables in the source system may be created when it is convenient for the source system independent of a downtime.

For all entries within the replicated transaction log, a lifetime of the entry may be determined by determining the next transaction log entry by source system natural (unique) key of the data. Resulting from this, each transaction log entry has a valid-from and a valid-to value. Then, for each entry in the snapshot table, the time frame (valid-from and valid-to from the transaction log) in which it was valid may be determined. Thus, each entry or tuple, respectively, in the snapshot has a valid-from and a valid-to value. For each valid-from value of the snapshot table, the number of tuples for which the valid-from value is between its own valid-from and valid-to range may be counted. Resulting from this, a histogram having a first coordinate axis denoting valid-from values and a second coordinate axis denoting a number of tuples that were valid at this time may be created. Then, the point in time at which the most tuples were valid may be determined based on the histogram. This point in time may be returned as an at least approximate value of the point in time at which the snapshot was created.

Further embodiments of the present disclosure provide computer readable storage media and computer systems for performing methods as described above.

FIG. 1 shows a schematic block diagram of a computer system 100 according to an embodiment. The computer system 100 includes source database systems 101, 102, 103, a data processing system 104 and a data warehouse system 114. Each of the source database systems 101, 102, 103, the data processing system 104 and the data warehouse system 114 may be provided in the form of a computer including a central processing unit, a volatile memory and/or a non-volatile memory. The source database systems 101, 102, 103, the data processing system 104 and the data warehouse system 114 may be connected by a known computer network, such as, for example, a local area network and/or a wide area network, such as, for example, the internet.

The source database systems 101, 102, 103, the data processing system 104 and the data warehouse system 114 need not be provided in the form of separate physical computers. Alternatively, one, some or all of the source database systems 101, 102, 103, the data processing system 104 and the data warehouse system 114 may be provided by virtual machines provided in a known hardware virtualization environment.

In further embodiments, one, some or all of the source database systems 101, 102, 103, the data processing system 104 and the data warehouse system 114 may be provided in the form of software programs, wherein some or all of the software programs may run on the same physical computer or virtual machine, or, alternatively, all software programs may run on different physical computers or virtual machines.

Each of the source database systems 101, 102, 103 may include a database management system and a source database. For example, the source database system 101 includes a database management system 105 and a source database 108. Similarly, the data processing subsystems 102, 103 include database management systems 106 and 107, respectively, and source databases 109 and 110, respectively.

The database management systems 105, 106, 107 may be provided in the form of known database management software systems allowing definition, creation, querying, update and administration of databases. The source databases 108, 109, 110 may be known relational databases, wherein each of the source databases 108, 109, 110 includes one or more source database tables. In FIG. 1, reference numeral 111 schematically denotes a source database table in the source database 108, and reference numerals 112 and 113, respectively, schematically denote source database tables in the source database 109 and the source database 110, respectively.

The present disclosure is not limited to embodiments wherein the source databases 108, 109, 110 are relational databases. In other embodiments, databases of other types, such as, for example, object oriented databases, which may also include source database tables, may be employed.

In some embodiments, one or more of the source database systems 101, 102, 103 may be part of a manufacturing execution system of a factory, such as, for example, a factory for the manufacturing of semiconductor devices as described above.

The present disclosure is not limited to embodiments wherein three source database systems 101, 102, 103 including source databases are provided. In other embodiments, a greater or smaller number of source database systems may be employed.

The data warehouse system 114 may include a data warehouse 116 which may be a database of a known type such as, for example, a database that is based on the relational database model. Additionally, the data warehouse system 114 may include a database management system 115, being software designed to allow the definition, creation, querying, update and administration of the data warehouse. Further features of the data warehouse system 114 may correspond to those of known data warehouse systems.

The data processing system 104 may include a data retriever 117, a validity time interval identifier 118 and a point in time calculator 119, which may, in some embodiments, be provided by software or modules of software of the data processing system 104.

Figure 2:
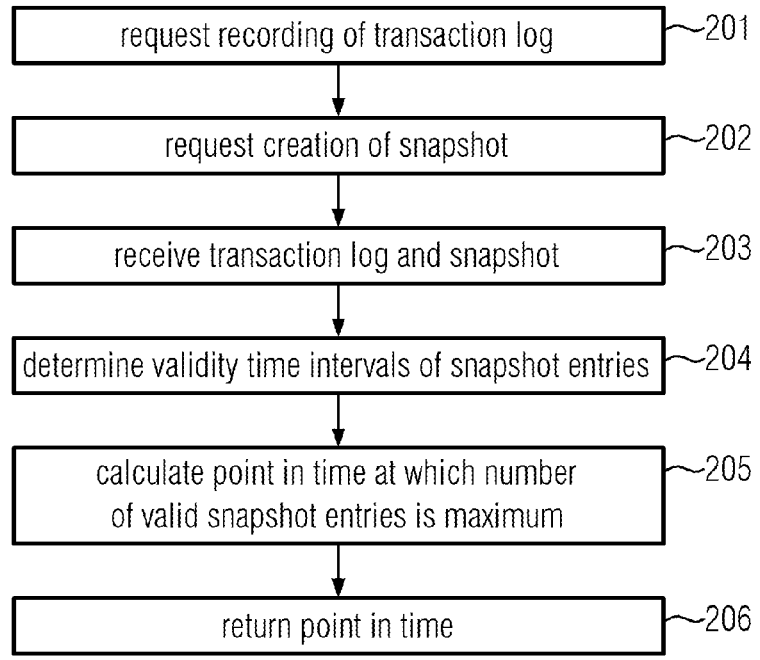
FIG. 2 shows a flow diagram illustrating steps that may be performed in a method according to an embodiment.

FIG. 2 shows a flow diagram illustrating a method according to an embodiment that may be carried out by the data processing system 104. In the following, an example of the method will be described wherein the data processing system 104 determines an approximate value of a point in time at which a snapshot of a source database table 111 provided in the source database 108 of the source database system 101 was created. Similar methods may be performed when one of the source database systems 102, 103 is used instead of the source database system 101, wherein components of the source database systems 102, 103 are operated in a manner corresponding to that described in the following for the components of the source database system 101.

In step 201, the data retriever 117 of the data processing system 104 requests the source database system 101 to record a transaction log. In step 202, the data retriever 117 requests the source database system 101 to create a snapshot of the source database table 111 during the recording of the transaction log. For requesting the recording of the transaction log and the creation of the snapshot of the source database table 111, in embodiments wherein the data processing system 104 and the source database system 101 are provided by separate physical computers or virtual machines, the data processing system 104 may establish a network connection to the source database system 101 and send the request to record the transaction log and the request to create the snapshot to the source database system 101 through the network connection. In embodiments wherein the source database system 101 and the data processing system 104 are provided in the form of software programs or modules of a software program running on the same physical computer or virtual machine, the request to record the transaction log and the request to create the snapshot of the source database table 111 may be performed by means of a call of a function of the software program or module of the software program, respectively.

Figure 3:
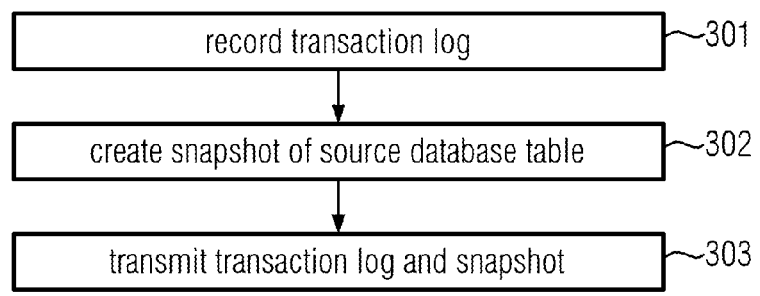
FIG. 3 shows a flow diagram illustrating steps that may be performed in a method according to an embodiment.

FIG. 3 shows a schematic flow diagram of a method according to an embodiment that may be carried out by the source database system 101 in response to the request to record the transaction log and the request to create the snapshot received from the data processing system 104.

In step 301, in response to the request to record the transaction log from the data processing system 104, the database management system 105 of the source database system 101 can start the recording of the transaction log. In some embodiments, this may be done by enabling a replication of a database transaction log of the source database system 101. In step 302, in response to the request from the data processing system 104 to create a snapshot of the source database table 111, the database management system 105 of the source database system 101 can create a snapshot of the source database table 111, for example, by enabling a replication of the source database table 111. The snapshot of the source database table 111 may be created during the recording of the transaction log.

The transaction log includes transaction log entries that are representative of transactions that include modifications of the source database table 111 which are performed during the recording of the transaction log. For each modification of the source database table 111, a transaction log entry of the transaction log may be provided.

The method according to the embodiment need not be performed during a downtime of the source database system 101. Therefore, after receiving the request to record the transaction log and the request to create the snapshot of the source database table 111, the source database system 101 can continue to perform transactions wherein changes of the source database 108 are made. These changes of the source database 108 may include modifications of the source database table 111, such as an insertion of entries into the source database table 111, deletions of entries from the source database table 111 and updates of entries of the source database table 111 wherein entries of the source database table 111 are modified. Each of the modifications of the source database table 111 may be logged in the transaction log, so that the transaction log obtains entries that are representative of the modifications.

In particular, the source database system 101 may continue to modify the source database table 111 while the snapshot of the source database table 111 is created. The source database system 101 may employ a multi-version concurrency control technique to create a consistent snapshot of the source database table 111, wherein the snapshot represents the state of the source database table 111 at a particular definite point in time at which the snapshot of the source database table 111 was created.

The creation of the snapshot of the source database table 111 may include a read transaction that is carried out by the database management system 105 of the source database system 101. The read transaction and other transactions carried out by the source database system 101, which may include transactions wherein the source database table 111 is modified, obtain time stamps. In accordance with the multi-version concurrency control technique, multiple versions of entries of the source database table 111 may be held within the source database system 101 until there is no necessity to hold the multiple versions anymore, for example, since all older transactions have been completed. When the source database table 111 is read in the read transaction for providing the snapshot of the source database table 111, the time stamp of the read transaction is compared with those of the multiple versions of the entries of the source database table 111, and a consistent snapshot of the source database table 111 that corresponds to the state of the source database table 111 at the point in time of the time stamp of the reading transaction is created on the basis of the timestamps and the multiple versions of the entries of the source database table 111.

In step 303, the source database system 101 transmits the transaction log and the snapshot of the source database table 111 to the data processing system 104. In step 203 (see FIG. 2), the data retriever 117 of the data processing system 104 receives the transaction log and the snapshot from the source database system 101.

FIG. 4 shows an illustrative example of the snapshot 400 of the source database table 111. The snapshot 400 corresponds to the state of the source database table 111 at a particular, definite point in time at which the snapshot 400 was created. The snapshot 400 includes a plurality of attributes 401, 402 and a plurality of snapshot entries 403, 404, 405. Attribute 401 of the snapshot 400 defines a unique key of the snapshot entries 403, 404, 405 of the snapshot 400. Attribute 402 may define a content of the snapshot entries 403, 404, 405. The content of the snapshot entries 403, 404, 405 may include facts, for example, numerical values or dimensions, for example textual descriptions.

In the illustrative example of FIG. 4, the unique key attribute 402 of the snapshot entry 403 has the value "1", and the content attribute 402 of the snapshot entry 403 has the value "A". The unique key attribute 401 of the snapshot entry 404 has the value "2", and the content attribute 402 of the snapshot entry 404 has the value "B". The unique key attribute 401 of the snapshot entry 405 has the value "3", and the content attribute 402 of the snapshot entry 405 has the value "C".

Compared to the relatively simple example illustrated in FIG. 4, which is provided for illustrating the concepts of the present disclosure, in embodiments, the source database table 111 and the snapshot 400 thereof may include a greater number of snapshot entries. Moreover, the source database table 111 and the snapshot 400 may include a greater number of attributes. In particular, instead of the single content attribute 402 of the illustrative example, a plurality of content attributes may be present. Nevertheless, in the following, for simplicity, reference will be made to "the content attribute," although it is understood that a plurality of content attributes may be present.

In some embodiments, the source database table 111 and the snapshot 400 thereof may represent relations in accordance with a relational database model. In such embodiments, the entries of the source database table 111 and the snapshot 400 represent tuples of the relation.

FIG. 5 shows an illustrative example of a transaction log 500 for the illustrative snapshot 400 of FIG. 4. The transaction log 500 may be provided in the form of a table, wherein the table has attributes 501, 502, 503, 504 and transaction log entries 505 to 511. Attribute 501 defines a source unique key, being the unique key of an entry of the source database table 111 involved in a modification of the source database table 111 represented by the respective transaction log entry.

Attribute 502 defines a type of the modification of the source database table 111. The type of the modification may be an insert, a deletion or an update of the entry of the source database table 111 having the unique key defined by the attribute 501.

Attribute 503 defines a modification time of the source database table 111 at which the modification of the source database table 111 represented by the respective transaction log entry was performed.

Attribute 504 defines a content of the entry of the source database table 111 that was modified in the modification of the source database table 111 represented by the respective transaction log entry. In embodiments wherein the source database table 111 has a plurality of content attributes, as described above, the transaction log 500 may also include a plurality of content attributes, wherein the content attributes of the transaction log 500 correspond to the content attributes of the source database table 111.

In addition to the attributes mentioned above, the transaction log 500 may include further attributes, in accordance with the requirements of the source database system 101. For clarity of illustration, in FIG. 5, such further attributes have been omitted.

The transaction log 500 may include one or more insert entries relating to modifications of the source database table 111 that include insertions of entries into the source database table 111. Transaction log entry 507 of the transaction log 500 is an insert entry, as indicated by the value "insert" of the modification type attribute 502. Additionally, the transaction log 500 may include one or more update entries relating to modifications of the source database table 111 that include updates of entries of the source database table 111. Transaction log entries 505, 506, 508, 509 and 511 are update entries, as indicated by the value "update" of the modification type attribute 502. The transaction log 500 may further include one or more delete entries relating to modifications of the source database table 111 that include deletions of entries of the source database table 111. Transaction log 510 is a delete entry, as indicated by the value "delete" of the modification type attribute 502.

Each of the insert entries of the transaction log 500 may include an image of the respective entry inserted into the source database table 111. In the example of the transaction log 500 shown in FIG. 5, the image of the entry inserted into the source database table 111 is provided by the values of the source unique key attribute 501 that corresponds to the value of the unique key attribute of the inserted entry of the source database table 111, and the value of the content attribute 504, which corresponds to the value of the content attribute of the entry inserted into the source database table 111.

Each of the update entries may include an image of the respective updated entry of the source database table 111 after the update. In the example of the transaction log 500 shown in FIG. 5, the image of the updated entry of the source database table 111 is provided by the value of the source unique key attribute 501, which corresponds to the value of the unique key attribute of the entry of the source database table 111, and the value of the content attribute 504, which corresponds to the value of the content attribute of the entry of the source database table 111 after the update.

Each of the delete entries may include an image of the respective deleted entry of the source database before the deletion. In the example of the transaction log 500 shown in FIG. 5, the image of the deleted entry is provided by the value of the source unique key attribute 501 and the value of the content attribute 504, which correspond to the values of the unique key attribute and the content attribute, respectively of the deleted entry of the source database table 111.

Accordingly, the update entries and the insert entries of the transaction log 500 include before-images of the corresponding entries of the source database table 111, and the delete entries of the transaction log 500 include after-images of the entries of the source database table 111.

Figure 6:
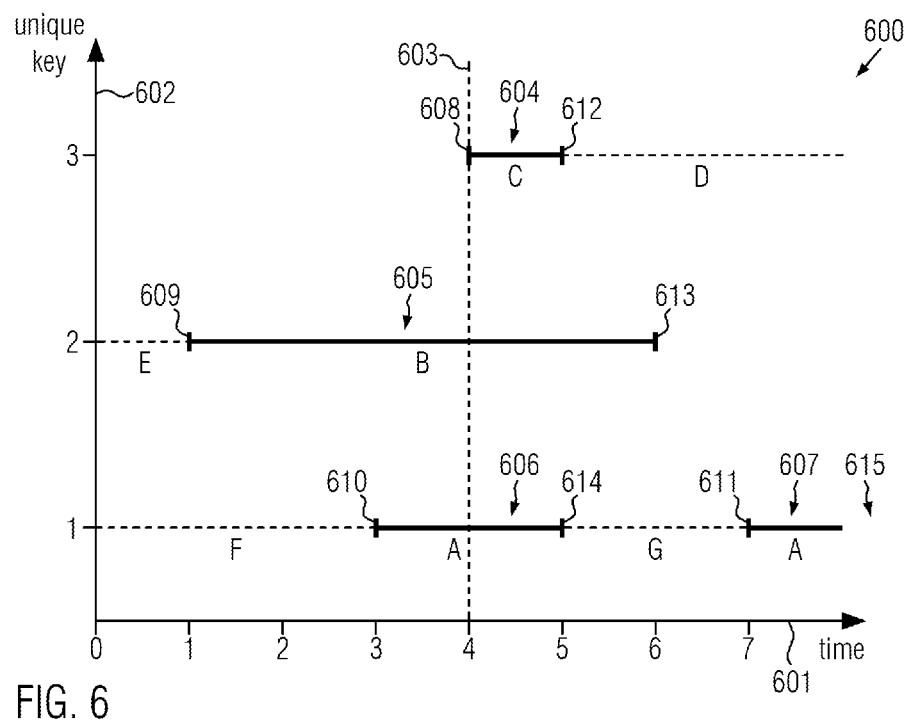
FIG. 6 illustrates modifications of entries of a source database table corresponding to the snapshot illustrated in FIG. 4 and the transaction log illustrated in FIG. 5.

FIG. 6 shows a diagram illustrating modifications of the source database table 111 in accordance with the examples of the snapshot 400 and the transaction log 500 shown in FIGS. 4 and 5. In the diagram 600, a horizontal coordinate axis 601 denotes time and a vertical coordinate axis 602 denotes the values of the unique key attributes of the entries of the source database table 111. A vertical dashed line 603 denotes the point in time at which the snapshot 400 of the source database table 111 was created by the source database system 101. As detailed above, this point in time may be unknown or known only with a relatively low accuracy to the data processing system 104.

In the example illustrated in FIGS. 4, 5 and 6, the entry of the source database table 111 having the value "1" of the unique key attribute (denoted as "entry 1" in the following) initially had a value of the content attribute of "F". At time 3, entry 1 was updated and obtained the value "A" of its content attribute. At time 5, entry 1 was updated again and obtained the value "G" of its content attribute. At time 7, a further update of entry 1 was performed, after which entry 1 had a value of the content attribute of "A" again.

In the transaction log 500, the update of entry 1 at time 3 is represented by the transaction log entry 506. The value of the source unique key attribute 501 is "1", corresponding to the value of the unique key attribute of entry 1, the value of the modification type attribute 502 is "update", the value of the modification time attribute 503 is "3" and the value of the content attribute 504 is "A", corresponding to the value of the content attribute of entry 1 after the update. Similarly, the updates of entry 1 at times 5 and 7 are represented by transaction log entries 508 and 511.

The entry of the source database table 111 having the value "2" of the unique key attribute (denoted as "entry 2" in the following) initially had a value of the content attribute of "E". At time 1, entry 2 was updated, and the value of the content attribute of entry 2 was changed to "B". In the transaction log 500, this update is represented by entry 505. At time 6, entry 2 was deleted from the source database table 111. In the transaction log 500, the deletion of entry 2 is represented by transaction log entry 510. The value "2" of the source unique key attribute 501 of entry 510 corresponds to the value of the unique key attribute of entry 2. The value "delete" of the modification type attribute 502 identifies entry 510 as a delete entry, and the value "6" of the modification time attribute denotes the point in time of the deletion of entry 2. The value "B" of the content attribute of entry 510 denotes the value of the content attribute of entry 2 before the deletion.

The entry of the source database table 111 having the value "3" of the unique key attribute (denoted as "entry 3" in the following) was inserted into the source database table 111 at time 4. In the transaction log 500, the insertion of entry 3 is represented by transaction log entry 507. The value "3" of the source unique key attribute 501 of transaction log entry 507 corresponds to the value of the unique key attribute of entry 3. The value "insert" of the modification type attribute 502 identifies transaction log entry 507 as an insert entry. The value "4" of the modification time attribute 503 represents the time of insertion of entry 3, and the value "C" of the content attribute of transaction log entry 507 corresponds to the value of the content attribute of entry 3 after the insertion. At time 5, entry 3 was updated, and the value of its content attribute was changed to "D". In the transaction log 500, the update of entry 3 is represented by transaction log entry 509.

At the point in time 603 at which the snapshot 400 was obtained, the content attributes of the entries of the source database table 111 had the values of the content attribute 402 of the corresponding snapshot entry in the snapshot 400 ("A" for entry 1, "B" for entry 2 and "C" for entry 3).

Referring again to FIG. 2, after step 203, wherein the data processing system 104 receives the snapshot 400 and the transaction log 500, one or more validity time intervals during which the snapshot entry is valid are determined for each of the snapshot entries 403, 404, 405 of the snapshot 400. A snapshot entry is valid as long as it matches a corresponding entry in the source database table 111.

In the example illustrated in FIGS. 4, 5 and 6, the snapshot entry 403 is valid during a validity time interval 606 from time 3 to time 5 and during a validity time interval 607 starting at time 7. During the validity time intervals 606, 607, entry 1 of the source database table 111 had the value "A" of the content attribute that is provided in entry 403 of the snapshot 400, wherein the unique key attribute 401 has the same value "1" as the unique key attribute of entry 1 of the source database table 111. Snapshot entry 404 is valid during a validity time interval 605 from time 1 to time 6, during which entry 2 of the source database table 111 having a value of the unique key attribute of "2" had the value "B" of the content attribute. Snapshot entry 405 is valid during a validity time interval 604 from time 4 to time 5, during which entry 3 of the source database table 111 having a value of the unique key attribute of "3" had the value "C" of the content attribute.

At the point in time 603 at which the snapshot 400 was created, the source database table 111 was identical to the snapshot 400. Accordingly, at the point in time 603, all the snapshot entries 403, 404, 405 of the snapshot 400 were valid.

Figure 8:
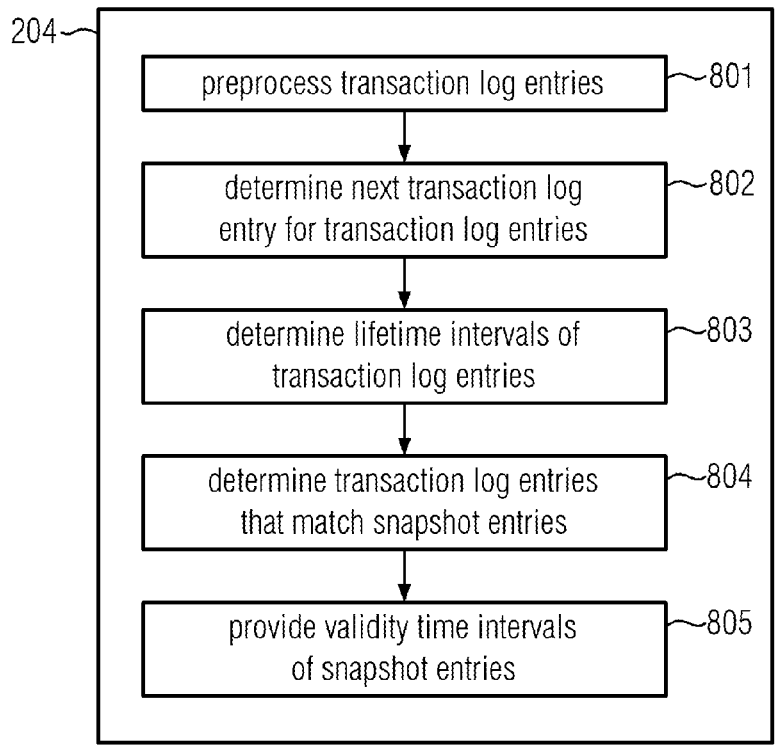
FIGS. 8-11 show flow diagrams illustrating steps that may be performed in methods according to embodiments.

In some embodiments, the determination of the validity time intervals 604 to 607 of the snapshot entries 403, 404, 405, which may be performed by the validity time interval identifier 118 of the data processing system 104, may be performed as described in the following, wherein reference is made to FIG. 8. FIG. 8 shows a flow diagram illustrating sub-steps of the step 204 of determining the validity time intervals of the snapshot entries.

In step 801, a preprocessing of the transaction entries 505 to 511 may be performed. In some embodiments, the preprocessing of the transaction log entries 505 to 511 may include a removal of transaction log entries relating to intermediate steps of transactions. In some embodiments, transactions carried out by the database management system 105 at the source database 108 may include a plurality of intermediate steps wherein entries of the source database table 111 are modified. The database management system 105 of the source database system 101, however, may provide an isolation of transactions carried out at the source database 108. Thus, the database management system 105 of the source database system 101 may prevent another transaction from reading entries of the source database table 111 that are written in steps of the transaction other than the last step. Accordingly, a read transaction carried out at the source database table 111 for creating the snapshot 400 will not read entries of the source database table 111 that are present only during intermediate steps of other transactions. For each transaction carried out by the source database system 101, the snapshot 400 will either correspond to the state of the source database table 111 before the transaction or to the state of the source database table 111 after the completion of the transaction. Therefore, transaction log entries of the transaction log 500 relating to intermediate steps of transactions may be removed for reducing the amount of data that needs to be processed for determining the validity time intervals of the snapshot entries 403, 404, 405.

In some embodiments, the value of the modification time attribute 503 of the transaction log entries 505 to 511 may correspond to the point in time at which the transaction wherein the entry of the source database table 111 was modified was completed. In such embodiments, transaction log entries relating to modifications of a particular entry of the source database table 111 that were performed in the same transaction may be identified, since they all have the same values of the source unique key attribute 501 and the modification time attribute 503. The last modification of a particular entry of the source database table 111 in the transaction may be identified, for example, from a log sequence number attribute (not shown in FIG. 5) of the transaction log 500.

In some embodiments, step 801, wherein the transaction log entries 505 to 511 are preprocessed may be omitted, and all transaction log entries may be maintained.

In step 802, a next transaction log entry may be determined for each of the transaction log entries of the transaction log or, in embodiments wherein a preprocessing of the transaction log entries including a removal of transaction log entries was performed, for those transaction log entries 505 to 511 that were maintained in the preprocessing. The next transaction log entry for a particular transaction log entry is a transaction log entry having the same value of the source unique key attribute 501 as the transaction log entry, and a value of the modification time attribute 503 that is greater than the value of the modification time attribute 503 of the transaction log entry, and smaller than the value of the modification time attribute 503 of any other transaction log entry having the same value of the source unique key attribute 501 as the transaction log entry and a value of the modification time attribute 503 that is greater than the value of the modification time attribute 503 of the transaction log entry.

For example, for the transaction log entry 506, relating to the update of entry 1 of the source database table 111 at time 3, the next transaction log entry is transaction log entry 508, relating to the update of entry 1 of the source database table 111 at time 5. Transaction log entry 511, having the same value of the source unique key attribute 501 as transaction log entry 506 is not the next transaction log entry for transaction log entry 506, since transaction log entry 508 also has the same value of the source unique key attribute 501, but a smaller value of the modification time attribute 503.

The determination of the next transaction log entries may be performed by sorting the transaction log entries 505 to 511, using the value of the source unique key attribute 501 as the primary sort key and the value of the modification time attribute 503 as the secondary sort key. After the sorting, the next transaction log entry for each transaction log entry is the next transaction log entry in the order.

The transaction log 500 may include transaction log entries for which there is no next transaction log entry. In the example of FIG. 5, this is the case for transaction log entries 510 and 511. In this case, in the determination of the next transaction log entries, a value indicating the absence of a next transaction log entry may be returned.

Thereafter, in step 803, a lifetime interval may be determined for each of the transaction log entries 505 to 511 (as far as the transaction log entries were not removed in the optional preprocessing step 801). The lifetime interval of a particular transaction log entry may be determined on the basis of the value of the modification time attribute 503 of the transaction log entry and the value of the modification time attribute 503 of the next transaction log entry. In particular, the lifetime interval of a transaction log entry may extend from the value of the modification time attribute 503 of the transition log entry to the value of the modification time attribute 503 of the next transaction log entry.

Thereafter, in step 804, for each of the snapshot entries 403, 404, 405, one or more of the transaction log entries 505 to 511 may be determined for which the value of the source unique key attribute 501 of the transaction log entry matches the value of the unique key attribute 401 of the snapshot entry and the value of the content attribute 504 of the transaction log entry matches the value of the content attribute 402 of the snapshot entry. In doing so, transaction log entries that are delete entries may be omitted from consideration, as will be detailed below. In step 804, for each of the snapshot entries 403, 404, 405, one or more transaction log entries are obtained that relate to modifications of the source database table 111, wherein the content attribute of the entry of the source database table 111 corresponding to the snapshot entry could have obtained the value of the content attribute 401 of the snapshot entry.

For example, among the transaction log entries 505 to 511 of the transaction log 500 illustrated in FIG. 5, transaction log entries 506 and 511 have a value "1" of the source unique key attribute 501 that matches the value of the unique key attribute 401 of the snapshot entry 403, and a value "A" of the content attribute 504 that matches the value of the content attribute 402 of the snapshot entry 403. Accordingly in step 804, transaction log entries 506, 511 may be determined as transaction log entries that match the snapshot entry 403.

The transaction log entries 506 and 511 represent modifications of the source database table 111 wherein the value of the content attribute of entry 1 of the source database was set to the value "A" that is present in snapshot entry 403. Accordingly, an entry of the source database table 111 corresponding to the snapshot entry 403 was obtained in the modification of the source database table 111 represented by the transaction log entry 506 and in the modification of the source database table 111 represented by the transaction log entry 511.

For snapshot entry 404, transaction log entries 505 and 510 match (values "2" of the source unique key attribute 501 and "B" of the content attribute 504). Transaction log entry 505 corresponds to the modification of the source database table 111 wherein entry 2 of the source database table 111 has obtained the value "B" of its content attribute.

Transaction log entry 510 is a delete entry corresponding to a deletion of the entry of the source database table 111 corresponding to the snapshot entry 404. The values of the source unique key attribute 501 and the content attribute 504 of transaction log entry 510 match the values of the unique key attribute 401 and the content attribute 402 of the snapshot entry 404, since, as detailed above, the values of the content attribute 504 of the delete entries of the transaction log 500 correspond to values of the content attribute of the deleted entries of the source database table 111 before the deletion. However, the delete entry 510 does not represent a modification of the source database table 111 wherein an entry of the source database table 111 corresponding to the snapshot entry 404 was obtained, since, after the modification of the source database table 111 represented by the transaction log entry 510, the entry of the source database table 111 corresponding to the snapshot entry 404 was not present anymore.

Therefore, in step 804, in determining transaction log entries that match snapshot entries, delete entries of the transaction log 500 may be omitted from consideration, so that no delete transaction log entries that match snapshot entries are determined. Hence, for snapshot entry 404, in step 804, only transaction log entry 505 is determined as a matching transaction log entry.

For the snapshot entry 405, in determining transaction log entries that match snapshot entries, transaction log entry 507 is determined, which corresponds to a modification of the source database table 111 wherein the entry of the source database table 111 corresponding to snapshot entry 405 has obtained the value "C" of its content attribute.

If, in step 804, no matching transaction log entry is found for a particular snapshot entry, the respective snapshot entry may be omitted from further consideration.

Thereafter, in step 805, the one or more validity time intervals for each of the snapshot entries 403, 404, 405 may be provided on the basis of the transaction log entries determined in step 804. Each validity time interval may be provided in the form of a valid-from time corresponding to the beginning of the validity time interval and a valid-to time corresponding to the end of the validity time interval.

As detailed above, the one or more transaction log entries determined in step 804 for a particular snapshot entry correspond to modifications of the source database table 111 wherein an entry of the source database table 111 having values of its attributes corresponding to those of the source database entry was obtained. Therefore, the value of the modification time attribute 503 of each transaction log entry determined for a particular snapshot entry in step 804 corresponds to a valid-from time of one validity time interval of the snapshot entry.

For example, the value of the modification time attribute 503 of transaction log entry 506 provides a valid-from time 610 that represents the beginning of the validity time interval 606 of snapshot entry 403, and the value of the modification time attribute 503 of transaction log entry 511 provides a valid-from time 611 that represents a beginning of the validity time interval 607. Similarly, valid-from times 608, 609 representing beginnings of the validity time intervals 604, 605 may be obtained from the values of the modification time attribute 503 of the transaction log entries 507, 505.

Valid-to times representing ends of the validity time intervals 604, 605, 606, 607 may be obtained from the next transaction log entries associated with the transaction log entries in step 802 described above.

For example, a valid-to time 614 representing an end of the validity time interval 606 of snapshot entry 403 may be obtained from the value of the modification time attribute 503 of the transaction log entry 508, which is the next transaction log entry for transaction log entry 506 from which the valid-from time 610 was obtained, and corresponds to the modification of the source database table 111 wherein the value of the content attribute of entry 1 of the source database table 111 corresponding to snapshot entry 403 was changed from "A" to "G".

For the transaction log entry 511, whose value of the modification time attribute 503 represents the beginning of the validity time interval 607, there is no next transaction log entry in the transaction log 500. In such cases, the valid-to time 615 of the validity time interval whose valid-from time is obtained from the transaction log entry having no next entry may be set to a value that indicates that the validity time interval is an open time interval, or it may be set to an upper bound of the time at which the snapshot 400 was created, for example, to the time at which the snapshot 400 was received by the data processing system 104.

A valid-to time 612 being a point in time of the end of validity time interval 604 may be obtained from the value of the modification time attribute 503 of transaction log entry 509, which is the next transaction entry for transaction log entry 507 whose modification time attribute value represents the valid-from time 608, and a valid-to time 613 of the validity time interval 605 may be obtained from the value of the modification time attribute 503 of the transaction log entry 510, which is the next transaction log entry for transaction log entry 505, whose modification time attribute 503 value represents the valid-from time of the validity time interval 605.

Reference is made to FIG. 2 again. After step 204, wherein validity time intervals of the snapshot entries 403, 404, 405 of the snapshot 400 are determined, in step 205, a point in time at which the number of valid snapshot entries is maximum may be calculated. This may be done by the point in time calculator 119 of the data processing system 104.

Figure 9:
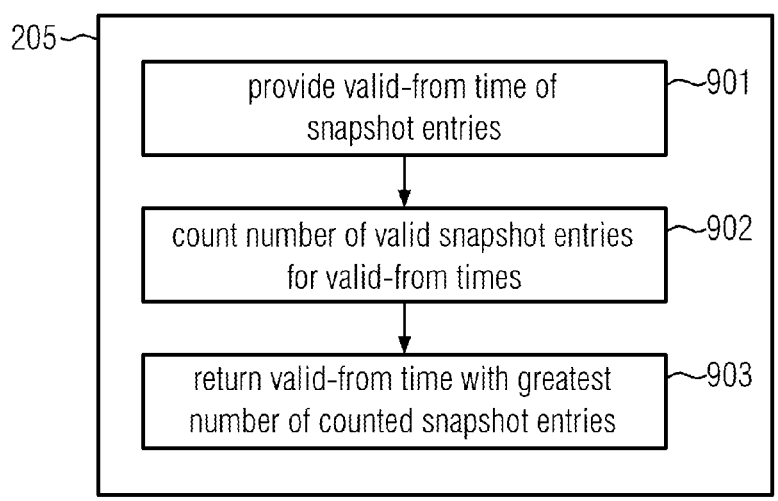

FIG. 9 shows a flow diagram illustrating sub-steps of step 205 that may be performed in embodiments for calculating the point in time at which the number of valid snapshot entries is maximum.

In step 901, the valid-from times of each of the snapshot entries 403, 404, 405 may be provided. In the example illustrated in FIGS. 4, 5 and 6, valid-from times 608, 609, 610 and 611 are provided, which have values of 4, 1, 3 and 7, respectively.

Thereafter, in step 902, for each of the valid-from times, a number of snapshot entries for which the valid-from time is within at least one of the one or more validity time intervals of the respective snapshot entry may be counted. For determining if a particular valid-from time is within the validity time interval of the snapshot entry, the valid-from time may be compared with the valid-from time of the validity time interval of the snapshot entry and the valid-to time of the validity time interval of the snapshot.

In the example of FIGS. 4, 5 and 6, at time 1, only snapshot entry 404 having the value 2 of the unique key attribute 401 is valid. At time 3, snapshot entries 403 and 404, having values of 1 and 2 of the unique key attribute 401 are valid. At time 4, each of the snapshot entries 403, 404, 405 is valid. At time 7, only snapshot entry 403 is valid.

Figure 7:
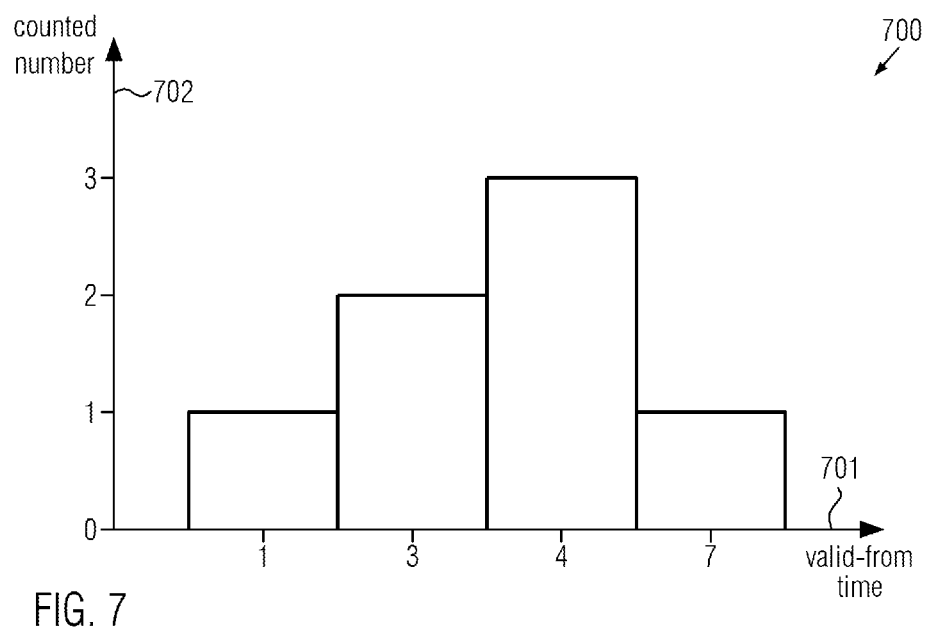
FIG. 7 shows a histogram obtainable by a method according to an embodiment from the snapshot illustrated in FIG. 4 and the transaction log illustrated in FIG. 5.

FIG. 7 shows a histogram 700 illustrating the thus obtained numbers of valid snapshot entries in the example of FIGS. 4, 5 and 6. A horizontal coordinate axis 701 denotes the values of the valid-from times 608, 609, 610, 611, and a vertical coordinate axis 702 denotes the counted number of valid snapshot entries. The counted number of snapshot entries is maximum for the valid-from time 4, which corresponds to the point in time 603 at which the snapshot 400 was created.

Reference is made again to FIG. 2. In step 206, the calculated point in time at which the number of valid snapshot entries is maximum may be returned as an approximate value of the point in time at which the snapshot 400 was created.

In the illustrative example described above with reference to FIGS. 4, 5, 6 and 7, at the point in time at which the snapshot 400 was created, the number of valid snapshot entries is equal to the total number of snapshot entries since, at this point in time, all the entries of the snapshot are valid. At earlier and later points in time, a smaller number of entries of the snapshot 400 are valid, so that a smaller number of valid snapshot entries are counted.

In other embodiments, in particular in embodiments wherein the snapshot 400 and the transaction log 500 include a substantially greater amount of data than in the illustrative example described above, and wherein preprocessing of the transaction log is performed, the counted maximum number of valid snapshot entries may be smaller than the total number of snapshot entries, even for the point in time at which the snapshot was created. There may be entries of the source database table that have not changed during the recording of the transaction log 500. For snapshot entries corresponding to such entries of the source database table, no validity time intervals are obtained by determining transaction log entries that match snapshot entries as described above, since no transaction log entries are created for entries of the source database table that are not modified. Moreover, in some embodiments, the preprocessing of the transaction log performed in step 801 may have some, although usually a small, number of errors associated therewith, which may also lead to an omission of some validity time intervals. However, it has been found that the embodiments disclosed herein may provide a reliable and accurate value of the point in time at which the snapshot 400 was created.

Figure 10:
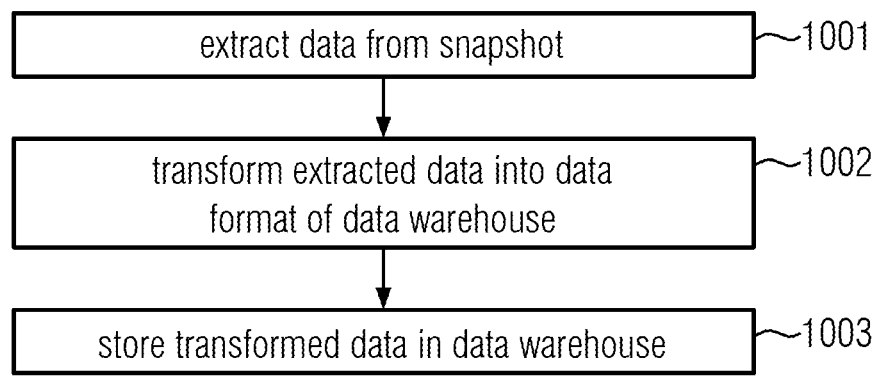

After the determination of the approximate value of the point in time at which the snapshot 400 was created, or simultaneously to the processing of the snapshot 400 and the transaction log 500 described above, the data warehouse 116 of the data warehouse system 114 may be initiated on the basis of the snapshot 400, as illustrated in the flow diagram shown in FIG. 10. In a step 1001, data may be extracted from the snapshot 400. In a step 1002, the extracted data may be transformed into a data format of the data warehouse system 114, and, in step 1003, the transformed data may be stored in the data warehouse 116. These steps may be performed, for example, by the database management system 115 of the data warehouse system 114 and/or by the data processing system 104 in accordance with conventional techniques of handling data warehouses.

Figure 11:
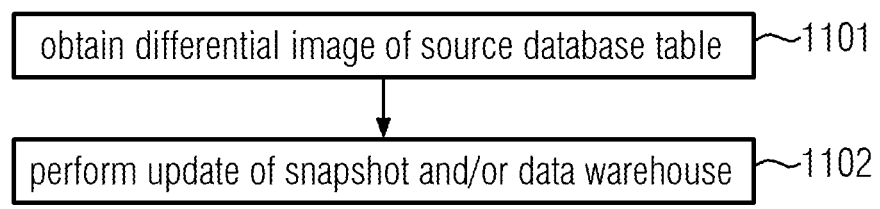
Figure 12A:
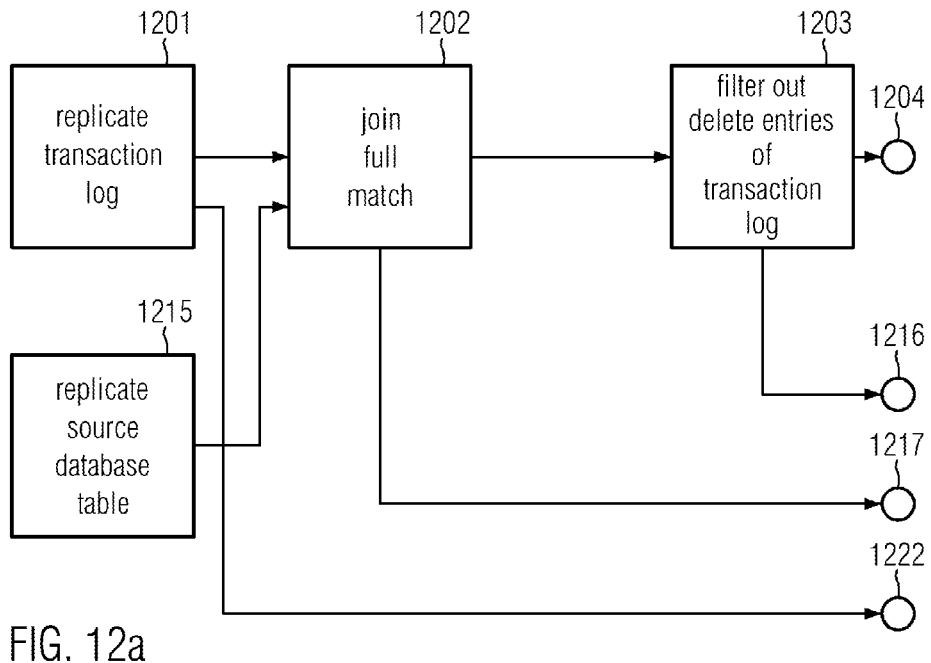
FIGS. 12*a*-12*d* show a flow diagram illustrating steps that may be performed in a method according to an embodiment.
Figure 12B:
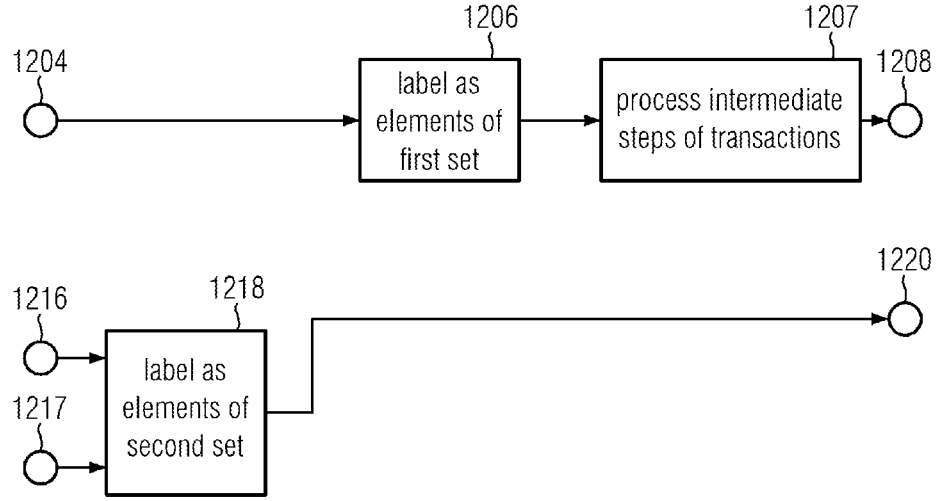
Figure 12C:
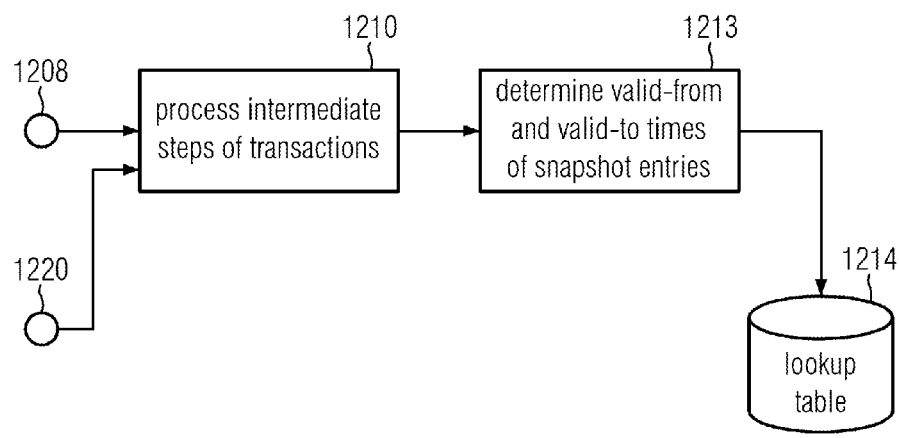
Figure 12D:
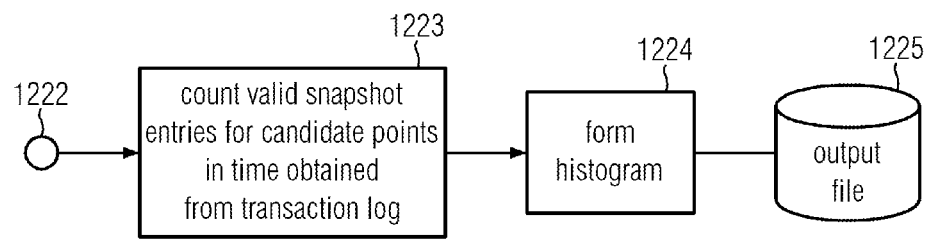

The approximate value of the point in time at which the snapshot 400 was created returned in step 206 described above may be used for performing incremental updates of the data warehouse 116, in accordance with the flow diagram shown in FIG. 11. In a step 1101, a differential image of the source database table 111 may be obtained, wherein the differential image includes modifications of the source database table 111 that were made after the approximate value of the point in time at which the snapshot 400 was created, determined in step 206. Thereafter, in step 1102, an update of the data warehouse 116 may be performed on the basis of the differential image. Features of the steps 1101, 1102 may correspond to those of conventional techniques for performing differential updates of databases. The steps 1101, 1102 may be performed by the source database system 101, the data warehouse system 114 and/or the data processing system 104.

In the following, further embodiments will be described with reference to FIGS. 12a-12d. FIGS. 12a, 12b, 12c and 12d show a flow diagram illustrating a method according to another embodiment that may be carried out using the computer system 100. At 1204, 1216 and 1217, transition is made between the portions of the flow diagram shown in FIGS. 12a and 12b. At 1222, transition is made between the portion of the flow diagram shown in FIG. 12a and the portion of the flow diagram shown in FIGS. 12d. At 1208 and 1220, transition is made between the portions of the flow diagram shown in FIGS. 12b and 12c.

In step 1201, a transaction log of a source data system, for example the database transaction log of the source data system 101 as shown in FIG. 1, is replicated. This may be done by the source database system 101 in response to a request to record a database transaction log of the source database system 101 received from the data retriever 117 of the data processing system 104, similar to the embodiment described above with reference to FIGS. 1-11.

In step 1215, a source database table, for example the source database table 111 of the source database system 101, may be replicated, for example in response to a request from the data retriever 117. In the replication of the source database table, a snapshot of the source database table is created, wherein, in some embodiments, the creation of the snapshot may have features as described above with reference to FIG. 2. The replication of the source database table 111 may be performed while the transaction log is replicated in step 1201, so that the replicated transition log includes transaction log entries that are representative of transactions including modifications of the source database table.

Features of the replicated transaction log obtained in step 1201 and the replicated source database table providing a snapshot of the source database table 111 obtained in step 1215 may correspond to those of the transaction log and the snapshot of the source database table 111 in the embodiments described above with reference to FIGS. 1-11. In particular, the snapshot of the source database table 111 may have features corresponding to those of the snapshot 400 described above with reference to FIG. 4, and the transaction log may have features corresponding to those of the transaction log 500 described above with reference to FIG. 5. The transaction log may have transaction log entries including insert entries, update entries and delete entries relating to modifications of the source database table 111 wherein entries of the source database table 111 were inserted, updated and/or deleted. The transaction log entries may include after-images of entries of the source database table that were inserted or updated, and before-images of entries of the source database table that were deleted.

The replicated translation log and the replicated source database table obtained in steps 1201, 1215 may be processed by the data processing system 104, as will be described in the following.

In step 1202, the snapshot entries from the replicated source database table and the transaction log entries of the replicated transaction log may be processed. The processing of the transaction log entries and the snapshot entries may include a join operation in accordance with a relational algebra join operation, wherein pairs of transaction log entries and snapshot entries are formed, and pairs of transaction log entries and snapshot entries are selected in accordance with a criterion. The criterion may be a full match between the snapshot entry and the image of the entry of the source database table provided in the transaction log entry that is paired with the snapshot entry. Thus, pairs of snapshot entries and transaction log entries are selected, wherein the transaction log entry represents a modification of the source database table 111 wherein an entry of the source database table 111 corresponding to the snapshot entry paired with the transaction log entry has been provided (if the transaction log entry is an update entry or an insert entry), or wherein an entry of the source database table 111 corresponding to the snapshot entry paired with the transaction log entry has been deleted from the source database table 111 (if the transaction log entry is a delete entry).

In the processing of the transaction log and the snapshot in step 1202, a first set that has elements that include transaction log entries whose image matches a snapshot entry may be formed. In some embodiments, the elements of the first set may include the selected pairs of transaction log entries and snapshot entries, as detailed above. The first set will be processed further in step 1203, as will be detailed below.

Furthermore, a second set may be formed that has elements that include those transaction log entries whose image does not match a snapshot entry. For example, the elements of the second set may be transaction log entries separated out in the join operation described above. The second set will be processed further in step 1218 (see FIG. 12b), as will be detailed below.

In step 1203, the first set may be subjected to a filter operation, wherein elements of the first set including transaction log entries that are delete entries are determined, and are included into the second set, for further processing in step 1218, as detailed below.

Those elements of the first set that include a transaction log entry that is not a delete entry, i.e., an update entry or an insert entry, may be labeled as elements of the first set in step 1206. In some embodiments, this may be done by adding an attribute having a value of a logical one to each of the elements of the first set.

In step 1207, the first set may be processed to remove elements of the first set that include transaction log entries corresponding to intermediate steps of transactions. This may be done as in step 801 of the method described above with reference to FIG. 8. In some embodiments, the elements of the first set may be grouped by the values of the source unique key attributes of the transaction log entries of the elements of the first set. The youngest entry of each group, which may be identified from the values of a log sequence number attribute of the transaction log entries, may be maintained to represent the group, and the other members of the group may be removed.

The elements of the second set obtained in step 1202 and the elements of the first set moved to the second set in step 1203 may be processed further in step 1218, wherein they are labeled as elements of the second set. This may be done by adding an attribute having a value of a logical zero to each of the elements of the second set.

In step 1210 (see FIG. 12*c*), the first set output from step 1207 and the second set output from step 1220 may be combined with each other, and the combination of the first set and the second set may be processed to remove elements of the second set including transaction log entries relating to intermediate steps of transactions. This may be done as in step 1207 described above and/or step 801 of the method described above with reference to FIG. 8.

Thereafter, in step 1213, the combination of the first set and the second set may be processed to associate each element of the first set with one element of the second set that includes a transaction log entry whose image of the entry of the source database table 111 has the same unique key as the image of the entry of the source database table 111 in the transaction log entry of the element of the first set, and a modification time that is next to and not earlier than the modification time of the transaction log entry of the element of the first set. This may be done, for example, by means of a rollup operation.

Then, in step 1214, a lookup table may be formed. The lookup table includes a plurality of entries. For each element of the first set, one entry of the lookup table may be provided. The entry of the lookup table includes an identifier of a snapshot entry which may, for example, be provided in the form of the unique key of the image of the transaction log entry of the element of the first set.

Each of the entries of the lookup table may further include a valid-from time provided in the form of the modification time of the transaction log entry of the element of the first set.

Furthermore, each of the entries of the lookup table may include a valid-to time. The valid-to time may be provided in the form of the value of the modification time of the transaction log entry of the second set that has been associated with the element of the first set. Accordingly, similar to the embodiment described above with reference to FIGS. 1-11, a valid-from time and a valid-to time are associated with each of the snapshot entries of the snapshot of the source database table 111 provided by the replication of the source database table in step 1215, wherein the valid from-time is representative of the beginning of a validity time interval of the snapshot entry, and the valid-to time is representative of an end of the validity time interval of the snapshot entry.

Thereafter, in step 1223, the replicated transaction log from step 1201 and the lookup table formed in step 1214 may be processed to count, for each of a number of candidate points in time, a number of valid snapshot entries. The candidate points in time may be obtained from the modification times of the transaction log entries of the replicated transaction log. The number of valid snapshot entries for the candidate points in time may be obtained from the lookup table formed in step 1214. The modification time of each of the transaction log entries of the replicated transaction log may be compared with the valid-from times and the valid-to times of the entries of the lookup table to determine if the respective snapshot entry was valid at the modification time of the transaction log entry, and the number of snapshot entries that were valid at the modification time of the transaction log entry may be counted.

Thereafter, in step 1224, a histogram may be determined from the counted numbers of valid snapshot entries, and a point in time corresponding to the maximum of the histogram may be returned as a point in time at which the number of valid snapshot entries is maximum, wherein the returned point in time provides an approximate value of a point in time at which the snapshot obtained in step 1215 by replicating the source database table 111 was created. The approximate value of the point in time at which the snapshot was created may be stored in an output file in step 1225.

In some embodiments, steps 1201, 1203, 1206, 1207, 1210, 1213, 1214 and 1218 may be performed by the validity time interval identifier 118 of the data processing system 104, and steps 1223, 1224 and 1225 may be performed by the point in time calculator 119.

Further features of the method of FIGS. 12*a*-12*d* may correspond to those of the method described above with reference to FIGS. 1-11.

Embodiments may include a computer readable storage medium, for example, a hard disc, a CD ROM, a DVD ROM and/or a USB stick on which a code for causing a computer to perform a method as described above with reference to FIGS. 1-11 and/or a method as described above with reference to FIGS. 12*a*-12*d* is stored.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
 requesting a source database system comprising a source database table to record a transaction log comprising a plurality of transaction log entries that are representative of transactions comprising modifications of said source database table and to create a snapshot of said source database table during the recording of said transaction log;
 for each of a plurality of snapshot entries in said snapshot, determining, on the basis of said transaction log, one or more validity time intervals during which said snapshot entry is valid, wherein said snapshot entry is valid as long as it matches a corresponding entry in said source database table; and
 calculating a point in time at which a number of valid ones among said plurality of snapshot entries is maximum and returning the calculated point in time as an approximate value of a point in time at which said snapshot was created.

2. The method of claim 1, wherein requesting said source database system to record said transaction log comprises enabling a replication of a database transaction log of said source database system.

3. The method of claim 2, wherein said source database system continues to modify said source database table while said snapshot of said source database table is created.

4. The method of claim 3, wherein the creation of said snapshot of said source database table comprises employing a multi-version concurrency control technique for creating a consistent snapshot of said source database table.

5. The method of claim 4, wherein each transaction log entry comprises a unique key of an entry of said source database table, information representative of a modification of said source database table performed and a modification time, and wherein the determination of the one or more validity time intervals for each of said plurality of snapshot entries comprises:
   for each of at least a subset of said plurality of transaction log entries, determining a next transaction log entry comprising the same unique key and determining a lifetime interval of the transaction log entry from the modification time of the transaction log entry and the modification time of the next transaction log entry; and
   for each of said plurality of snapshot entries, determining one or more of said at least a subset of said plurality of transaction log entries for which the unique key and the information representative of the modification of said source database table performed match said snapshot entry, and providing said one or more validity time intervals of said snapshot entry on the basis of the lifetime intervals of the determined one or more transaction log entries.

6. The method of claim 5, wherein the lifetime intervals of said determined one or more transaction log entries are returned as the one or more time intervals during which said snapshot entry was valid.

7. The method of claim 5, further comprising, before determining the next transaction log entry for each of said at least a subset of said plurality of transaction log entries, performing a preprocessing of said transaction log.

8. The method of claim 7, wherein the preprocessing of said transaction log comprises removing transaction log entries relating to intermediate steps of transactions.

9. The method of claim 6, wherein the calculation of the point in time at which the number of valid ones among the plurality of entries of said snapshot is maximum comprises:
   for each of the one or more validity time intervals of each of said plurality of snapshot entries, providing a valid-from time being a point in time of the beginning of the respective time interval;
   for each valid-from time, counting a number of snapshot entries for which the valid-from time is within at least one of the one or more validity time intervals of the respective snapshot entry; and
   returning the valid-from time with the greatest number of counted snapshot entries as the point in time at which the number of valid ones among the plurality of entries of the snapshot is maximum.

10. The method of claim 9, further comprising:
   extracting data from said snapshot;
   transforming the extracted data into a data format of a data warehouse; and
   storing the transformed data in the data warehouse.

11. The method of claim 10, further comprising:
   obtaining a differential image of said source database table, said differential image comprising modifications of said source database table that were made after the calculated point in time at which the number of valid ones among the plurality of entries of said snapshot is maximum; and
   performing an update of said data warehouse on the basis of said differential image.

12. The method of claim 1, wherein said plurality of transaction log entries of said transaction log comprises:
   insert entries relating to modifications of said source database table comprising insertions of entries into said source database table, each of said insert entries comprising an image of the respective entry inserted into said source database table,
   update entries relating to modifications of said source database table comprising updates of entries of said source database table, each of said update entries comprising an image of the respective updated entry of said source database table after the update; and
   delete entries relating to modifications of said source database table comprising deletions of entries of said source database table, each of said delete entries comprising an image of the respective deleted entry of said source database table before the deletion;
   wherein each of said insert entries, update entries and delete entries comprises a modification time of said source database table; and
   wherein each of said entries of said source database table comprises a unique key and each of the images of said entries of said source database table in said transaction log entries comprises the unique key of the respective entry of the source database.

13. The method of claim 12, wherein the determination of said one or more validity time intervals for each of said plurality of snapshot entries comprises:
   processing said snapshot entries and said transaction log entries to form a first set having elements that comprise transaction log entries whose image matches a snapshot entry and a second set having elements that comprise transaction log entries whose image does not match a snapshot entry;
   determining all elements of the first set comprising transaction log entries that are delete entries and moving these elements from the first set to the second set;
   thereafter, processing the first set and the second set to associate each element of the first set with one element of the second set that comprises a transaction log entry whose image has the same unique key as the image of the transaction log entry of the element of the first set and a modification time that is next to and not earlier than the modification time of the transaction log entry of the element of the first set; and
   forming a lookup table comprising a plurality of entries, wherein, for each element of the first set, one entry of the lookup table is provided that comprises an identifier of a snapshot entry obtained on the basis of the unique key of the image of the transaction log entry of the element of the first set, a valid-from time obtained on the basis of the modification time of the transaction log entry of the element of the first set, and a valid-to time obtained on the basis of the modification time of the transaction log entry of the element of the second set that is associated with the element of the first set, the valid-from time being representative of a beginning of the validity time interval of the snapshot entry identified by the identifier, the valid-to time being representative of an end of the validity time interval of the snapshot entry identified by the identifier.

14. The method of claim 13, wherein the calculation of the point in time at which the number of valid ones among the plurality of entries of the snapshot is maximum comprises:
  processing the lookup table to count, for each of a plurality of points in time, a number of snapshot entries that are valid at the point in time;
  determining one point in time form the plurality of points in time for which the counted number of snapshot entries that are valid at the point in time is maximum; and
  returning the determined point in time as the point in time at which the number of valid ones among the plurality of entries of the snapshot is maximum.

15. The method of claim 14, wherein the plurality of points in time is obtained by processing the transaction log.

16. The method of claim 14, further comprising:
  before processing the first set and the second set, removing elements of the first set and elements of the second set comprising transaction log entries relating to intermediate steps of transactions.

17. The method of claim 16, wherein the formation of said first set and said second set comprises a join operation.

18. A non-transitory computer-readable storage medium comprising code for causing a computer to:
  request a source database system comprising a source database table to record a transaction log comprising a plurality of transaction log entries that are representative of transactions comprising modifications of said source database table and to create a snapshot of said source database table during the recording of said transaction log;
  to determine, for each of a plurality of snapshot entries in said snapshot, one or more validity time intervals during which the respective snapshot entry is valid, wherein said snapshot entry is valid as long as it matches a corresponding entry in said source database table, the determination of said one or more validity time intervals being performed on the basis of said transaction log; and
  to calculate a point in time at which a number of valid ones among the plurality of snapshot entries is maximum and to return the calculated point in time as an approximate value of a point in time at which said snapshot was created.

19. A data processing system, comprising:
  a data retriever executing in a computer, said data retriever establishing a connection to a source database system and requesting said source database system to record a transaction log comprising a plurality of transaction log entries that are representative of transactions comprising modifications of a source database table stored in said source database system, requesting said source database system to create a snapshot of said source database table while said transaction log is recorded, and receiving said transaction log and said snapshot from said source database system;
  a validity time interval identifier executing in said computer, said validity time interval identifier determining, for each of a plurality of snapshot entries in said snapshot, one or more validity time intervals during which the respective snapshot entry is valid, wherein the snapshot entry is valid if it matches a corresponding entry in said source database table, the determination of the one or more validity time intervals being performed on the basis of said transaction log; and
  a point in time calculator executing in said computer, said point in time calculator calculating a point in time at which a number of valid ones among the plurality of snapshot entries is maximum, the calculation of the point in time being performed on the basis of the determined validity time intervals, and returning the calculated point in time as an approximate value of a point in time at which said snapshot was created.

20. A computer system comprising a source database system and a data processing system;
  the source database system comprising:
    a source database comprising a source database table;
    means for recording a transaction log comprising a plurality of transaction log entries that are representative of transactions comprising modifications of said source database table;
    means for creating a snapshot of said source database table during the recording of said transaction log; and
    means for transmitting said snapshot and said transaction log to said data processing system;
  the data processing system executed in a computer, comprising:
    means for receiving said snapshot and said transaction log from said source database system;
    means for determining, for each of a plurality of snapshot entries in said snapshot, one or more validity time intervals during which the snapshot entry is valid, wherein the snapshot entry is valid as long as it matches a corresponding entry in said source database table, the determination of the validity time intervals being performed on the basis of said transaction log; and
    means for calculating a point in time at which a number of valid ones among the plurality of snapshot entries of said snapshot is maximum and returning the calculated point in time as an approximate value of a point in time at which said snapshot was created.

* * * * *